(12) United States Patent
Ahn

(10) Patent No.: US 7,584,410 B2
(45) Date of Patent: Sep. 1, 2009

(54) FREQUENCY ERROR DETECTOR AND COMBINER IN RECEIVING END OF MOBILE COMMUNICATION SYSTEM

(75) Inventor: Won-Ick Ahn, Seoul (KR)

(73) Assignee: Samsung Electronics Co., Ltd. (KR)

(*) Notice: Subject to any disclaimer, the term of this patent is extended or adjusted under 35 U.S.C. 154(b) by 289 days.

(21) Appl. No.: 10/634,451

(22) Filed: Aug. 5, 2003

(65) Prior Publication Data
US 2004/0049717 A1 Mar. 11, 2004

(30) Foreign Application Priority Data
Sep. 11, 2002 (KR) ............ 10-2002-0055168

(51) Int. Cl.
*G06F 11/00* (2006.01)
(52) U.S. Cl. ............... 714/799; 714/704; 714/699; 375/148
(58) Field of Classification Search ......... 714/799, 714/48, 53, 704, 699; 375/344, 148
See application file for complete search history.

(56) References Cited

U.S. PATENT DOCUMENTS

| 5,953,366 | A |   | 9/1999 | Naruse et al. |         |
|-----------|-----|---|--------|---------------|---------|
| 6,278,725 | B1 | * | 8/2001 | Rouphael et al. | 375/148 |
| 6,304,620 | B1 | * | 10/2001 | Rouphael      | 375/344 |
| 6,741,665 | B2 | * | 5/2004 | Kenney et al. | 375/344 |
| RE38,603  | E  |   | 9/2004 | Kim et al.    |         |
| 6,795,488 | B1 | * | 9/2004 | Iwakiri       | 375/148 |
| 2003/0079054 | A1 | * | 4/2003 | Miller     | 709/400 |

FOREIGN PATENT DOCUMENTS

| CA | 2 374 699 | 6/2002 |
| EP | 0 989 687 | 3/2000 |
| EP | 1 184 991 | 3/2002 |
| GB | 2 369 275 | 5/2002 |

OTHER PUBLICATIONS

European Search Report dated Nov. 27, 2003 issued in a counterpart application, namely Appln. No. 03020715.3.

* cited by examiner

*Primary Examiner*—Esaw T Abraham
*Assistant Examiner*—Fritz Alphonse
(74) *Attorney, Agent, or Firm*—The Farrell Law Firm, LLP

(57) ABSTRACT

Disclosed is a frequency error detector and combiner at a receiving end of a mobile communication system. The frequency error detector and combiner using a diversity operation at a reception end of a mobile communication system includes: a plurality of fingers respectively having a diversity combiner for diversity-combining reference symbols used for a frequency error detection, and a frequency error detector for combining output signals of the diversity combiner to generate a frequency offset value; and a frequency error combiner for performing a multipath diversity combination on output signals of the frequency error detector.

2 Claims, 5 Drawing Sheets

FREQUENCY ERROR DETECTOR AND COMBINER IN RECEIVING END OF MOBILE COMMUNICATION SYSTEM

PRIORITY

This application claims priority to an application entitled "FREQUENCY ERROR DETECTOR AND COMBINER IN RECEIVING END OF MOBILE COMMUNICATION SYSTEM", filed in the Korean Intellectual Property Office on Sep. 11, 2002 and assigned Serial No. 2002-55168, the contents of which are incorporated herein by reference.

BACKGROUND OF THE INVENTION

1. Field of the Invention

The present invention relates to a frequency error detector and combiner in a mobile communication system.

2. Description of the Related Art

Typically, a mobile communication system is classified into a synchronous mobile communication system and an asynchronous mobile communication system. The asynchronous mobile communication system has been adopted in Europe, and the synchronous mobile communication system has been adopted in the U.S.A. Such a mobile communication system used in Europe is called a UMTS (Universal Mobile Telecommunication System), and a mobile communication terminal in the UMTS is called a UE (User Equipment).

In this system, a frequency offset is a factor causing unavoidable performance deterioration in a mobile communication system in that a carrier frequency gradually changes with temperature. Therefore, an AFC (Automatic Frequency Control) operation for compensating the frequency offset is needed. A reference signal of a frequency error control loop in the UMTS is a common pilot channel signal (hereinafter referred to as a CPICH).

FIG. 1 is a view illustrating a modulation pattern of the common pilot channel (CPICH). An average phase of the CPICH is calculated by selecting an arbitrary time period irrespective of a transfer rate of a traffic channel. The CPICH can calculate a phase variation from continuous CPICH signals in that it transmits non-modulated signals. That is, coordinates of a current reception symbol can be calculated by allowing a reception signal to be an I&D (Integrate & Dump)-processed during a predetermined period, and a phase variation of the current reception symbol is calculated by these coordinates and the coordinates of a previous reception symbol. Such a calculated value is a linear estimation value with respect to a low phase variation, and the linear estimation value is proportional to a frequency error. Such a phase variation occurs because a terminal has a relatively inaccurate timing with respect to a base station.

A timing reference of a terminal is a VCTCXO (Voltage-Controlled Temperature Crystal Oscillator). A timing error caused by a small frequency error of the VCTCXO occurs. Therefore, the timing error caused by a frequency difference between a terminal and a base station is corrected by controlling a control voltage of the VCTCXO. A phase variation of the CPICH detected by a phase error detector of an AFC module is multiplied by an appropriate gain in a loop filter and then indefinitely accumulated. An output signal of the loop filer is converted to a PDM (Pulse Duration Modulation) signal, and becomes a digital pulse signal for controlling a frequency of the VCTCXO.

The universal mobile telecommunication system (UMTS) supports an open loop transmission diversity and a closed loop transmission diversity as a transmission (Tx) diversity. In this case, the UMTS uses a STTD (Space Time Transmission Diversity) method as the open loop transmission diversity. In the case of supporting the STTD method, the UMTS transmits CPICH symbol patterns orthogonal to each other using two antennas. A frequency error detector detects frequency errors using a CPICH signal received from two antennas undergoing different independent fading phenomena, adjusts a gain by combining the frequency errors, and then transfers the resultant frequency error signal to a loop filter. In this case, the frequency error detector obtains a multipath diversity effect by combining time-delayed independent frequency errors generated by a multipath of a channel, thereby enhancing a performance of a control loop.

There are various kinds of method for detecting/combining frequency errors in a user equipment (UE) of the UMTS. Two of the methods are a method using an arc tangent and method using a CPFDD (Cross Product Frequency Difference Detector), in the method for detecting frequency errors. The method using the arc tangent performs a normalization operation with a signal magnitude, but the other method using the CPFDD provides a frequency with a weighted value on the basis of a signal magnitude without performing a normalization operation. That is, since signal accuracy is degraded by noises in case of a low signal magnitude, the method using the CPFDD for providing a weighted value accurately estimates a phase error as compared with the method using the arc tangent in the actual channel circumstances. However, the method using the arc tangent estimates a phase error more accurately than the method using the CPFDD.

An algorithm using the arc tangent and another algorithm using the CPFDD in the UMTS system will be hereinafter described. The two algorithms use a previous value and a current value of the sum of two CPICH symbols as input signals to discriminate between antenna patterns. In other words, the algorithms perform an I&D process on received CPICH signals using 256 chips, remove an antenna pattern from the received CPICH signals, and have complex numbers shown in the following equation 1 on the basis of the sum of two symbols. Herein, CPICH signals express a complex number. The complex number comprises a real number and an imaginary number. R is the real number (or real part). I is the imaginary number (or imaginary part).

$$CPICH1_{prev} = R_1 + jI_1,\ CPICH1_{current} = R_2 + jI_2$$

$$CPICH2_{prev} = R_3 + jI_3,\ CPICH2_{current} = R_4 + jI_4 \quad [\text{Eq. 1}]$$

A method for calculating a phase estimation value according to the arc tangent algorithm using the above complex numbers of a CPICH reference symbol can be expressed as the following equation 2, and a method for calculating a phase estimation value according to the CPFDD algorithm can be expressed as the following equation 3.

$$\hat{\theta}_1 = \tan^{-1}\left(\frac{R_1 I_2 - R_2 I_1}{R_1 R_2 + I_1 I_2}\right) \quad [\text{Eq. 2}]$$

$$\hat{\theta}_2 = \tan^{-1}\left(\frac{R_3 I_4 - R_4 I_3}{R_3 R_4 + I_3 I_4}\right)$$

$$\hat{\theta} = \hat{\theta}_1 + \hat{\theta}_2$$

$$\hat{\theta}_1 = Im\{CPICH_{current} \cdot CPICH^*_{prev}\} = R_1 I_2 - R_2 I_1$$

$$\hat{\theta}_2 = Im\{CPICH_{current} \cdot CPICH^*_{prev}\} = R_3 I_4 - R_4 I_3$$

$$\hat{\theta} = \hat{\theta}_1 + \hat{\theta}_2 \quad [\text{Eq. 3}]$$

Phase estimation values calculated by the above equations 2 and 3 are combined according to a multipath.

However, provided that a first antenna 1 has a normal channel environment and a second antenna 2 forms a serious fading path if a frequency error is very low, a problem occurs even if the CPFDD is used. A first CPFDD 1 receiving a CPICH symbol of the first antenna 1 generates an output signal of almost zero, but a second CPFDD2 receiving a CPICH symbol of the second antenna 2 generates an inaccurate output signal because of serious fading. Complex planes of a CPICH reference symbol prior to performing such antenna diversity combination are shown in FIGS. 2*a*~2*b*. It is anticipated that such a fading value is not high, but a magnitude of a residual frequency error can be increased according to a fading length (e.g, a fading duration). That is, a CPICH reference symbol from a first antenna 1 shown in FIG. 2*a* is not affected by noises of an oblique-lined area 10, but a CPICH reference symbol from a second antenna 2 shown in FIG. 2*b* is affected by noises of an oblique-lined area 10.

SUMMARY OF THE INVENTION

Therefore, the present invention has been made in view of the above problems, and it is an object of the present invention to provide a frequency error detector and combiner that greatly reduces the effects of a fading phenomenon.

In accordance with the present invention, the above and other objects can be accomplished by the provision of a frequency error detector and combiner using a diversity operation at a reception end of a mobile communication system, including a plurality of fingers respectively having a diversity combiner for diversity-combining reference symbols used for a frequency error detection, a frequency error detector for combining output signals of the diversity combiner to generate a frequency offset value and a frequency error combiner for performing a multipath diversity combination on output signals of the frequency error detector.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
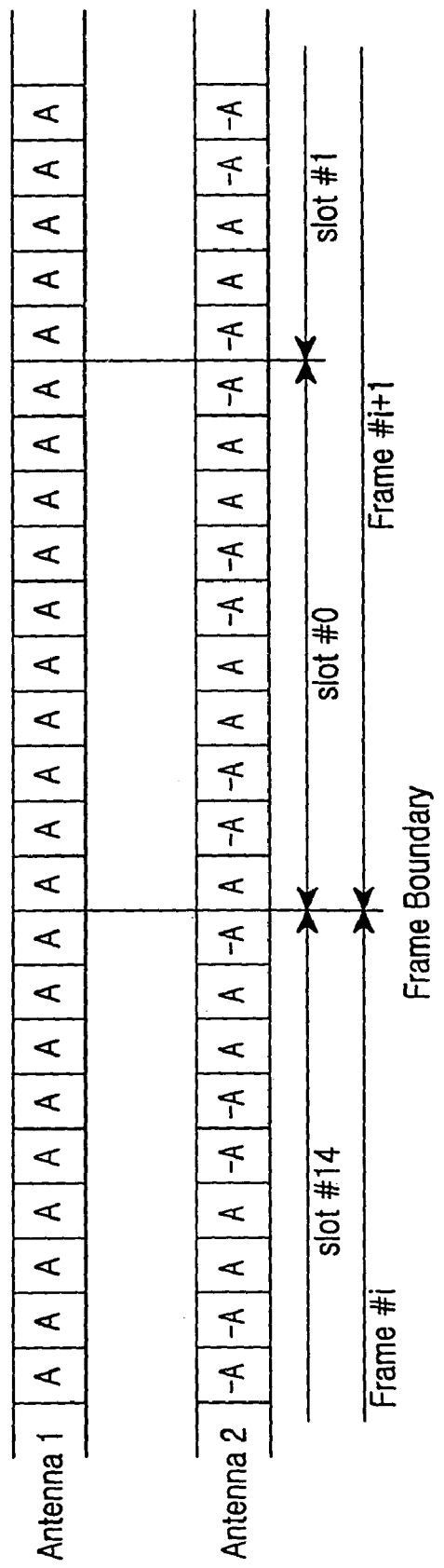
FIG. 1 is a view illustrating a modulation pattern of the common pilot channel (CPICH)
Figures 2A, 2B:
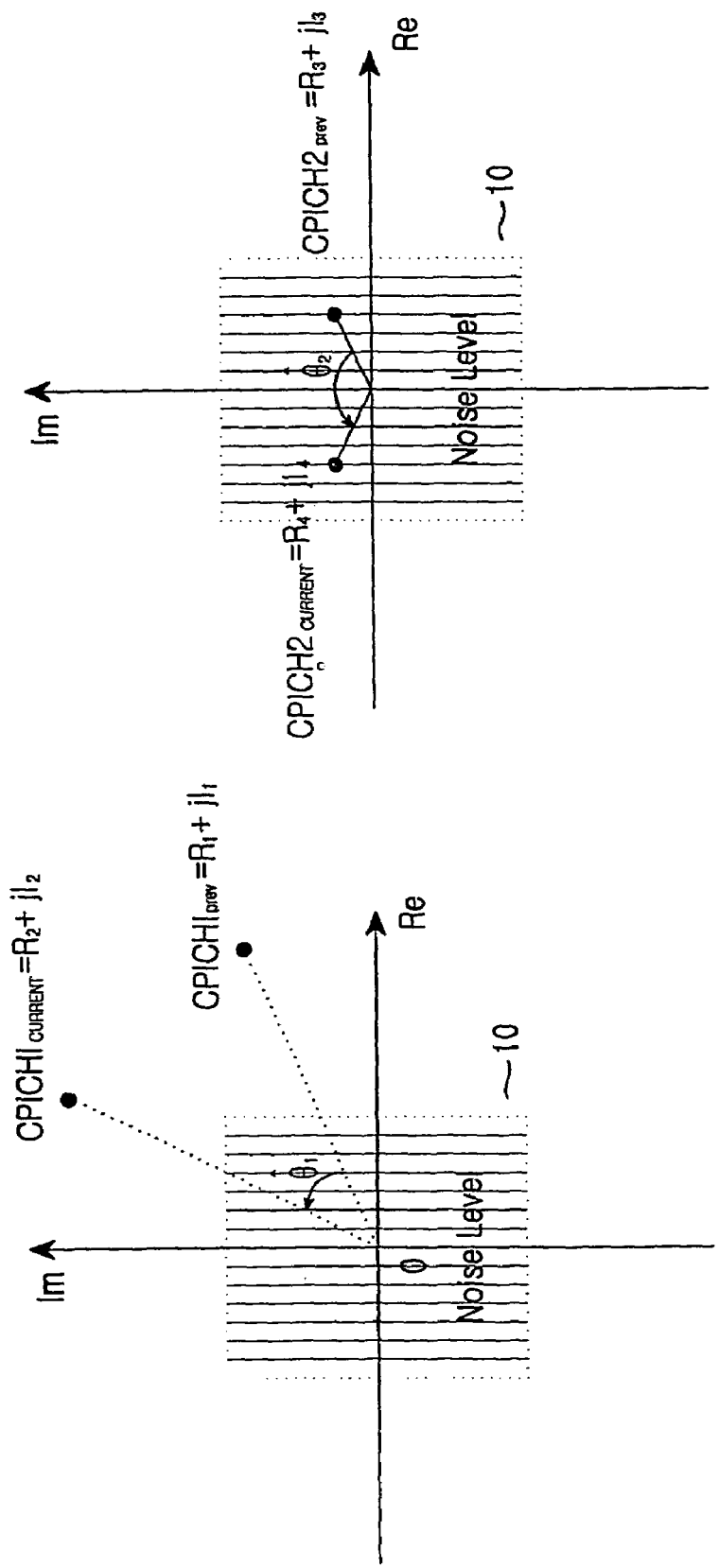
FIGS. 2*a* and 2*b* are complex planes of CPICH reference symbols prior to performing an antenna diversity combination.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted as it may obscure the subject matter of the present invention.

The present invention provides a frequency offset detector and combiner of an automatic frequency error control loop for use in a UE of a UMTS. For this purpose, the present invention divides a frequency error combiner into a frequency error combiner using an antenna and a frequency error combiner using a multipath. A frequency error combiner for obtaining a diversity effect by an antenna in the case of a STTD (Space Time Transmit Diversity) is positioned in front of a frequency error detector. So, although one signal has an incorrect value due to noise, the incorrect value can be compensated for by the other signal and the amount of hardware can be reduced because a CPFDD block is reduced in proportion to the number of fingers.

Figure 3:
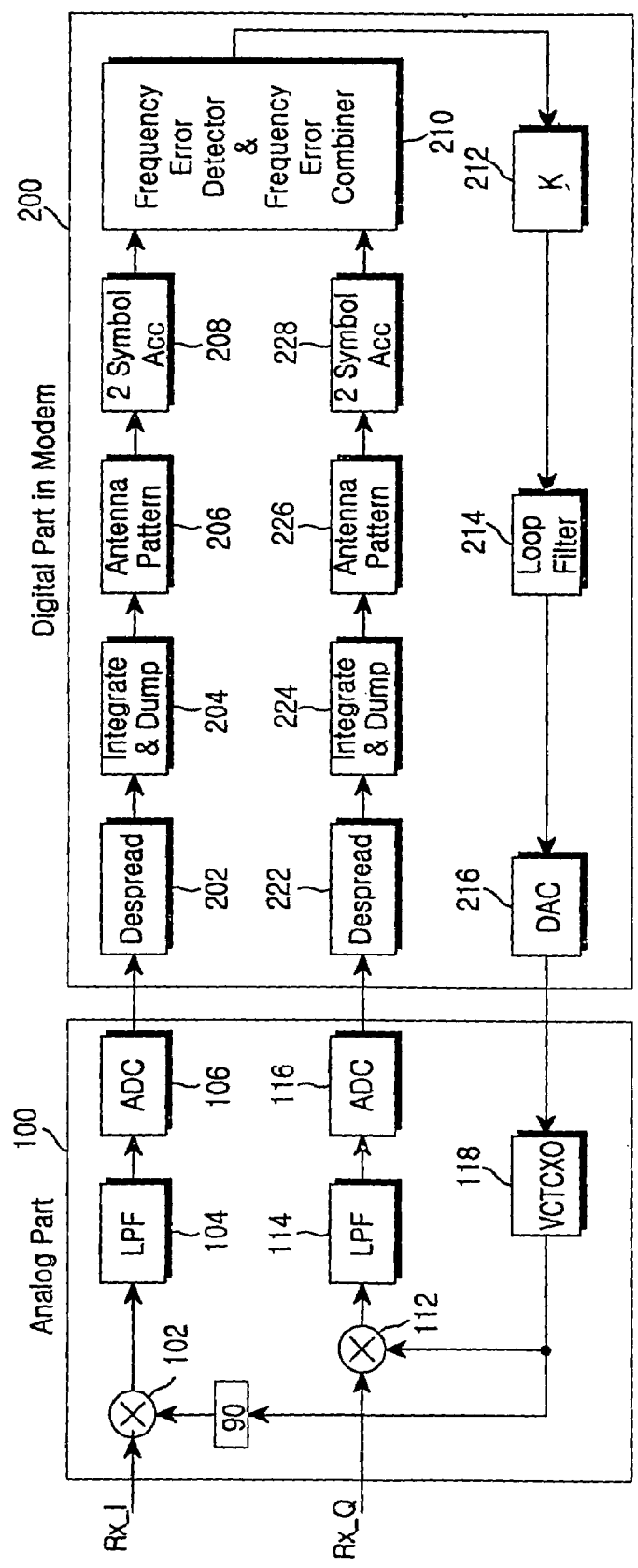
FIG. 3 is a view illustrating a block diagram of an automatic frequency controller (AFC) in a user equipment (UE) of a universal mobile telecommunication system (UMTS) in accordance with a preferred embodiment of the present invention.

FIG. 3 is a block diagram of an automatic frequency controller (AFC) in a user equipment (UE) of a universal mobile telecommunication system (UMTS) in accordance with a preferred embodiment of the present invention.

A timing reference of a terminal is a VCTCXO (Voltage-Controlled Temperature Crystal Oscillator). A timing error occurs by a small frequency error of the VCTCXO. Therefore, the timing error caused by a frequency difference between a terminal and a base station is corrected by controlling a control voltage of the VCTCXO. A phase variation of the CPICH detected by a phase error detector of an AFC module is multiplied by an appropriate gain in a loop filter and then indefinitely accumulated. An output signal of the loop filer is converted to a PDM (Pulse Duration Modulation) signal, and becomes a digital pulse signal for controlling a frequency of the VCTCXO.

Referring to FIG. 3, an AFC includes an analog part 100 and a digital part 200. The analog part 100 includes mixers 102 and 112, a phase shifter 90, LPFs (Low Pass Filters) 104 and 114, and ADC (Analog-to-Digital Converter) 106 and 116. The analog multipliers 102 and 112 multiply an I signal received from a first antenna and a Q signal received from a second antenna by an output signal of a VCTCXO (Voltage-Controlled Temperature Crystal Oscillator) 118. The phase shifter 120 shifts a phase of the output signal of the VCTCXO 118 functioning as a local oscillator by an angle of 90°, and then outputs the phase-shifted signal to the analog multiplier 102. The LPFs 104 and 114 filter carrier frequency signals in association with the I and Q signals, respectively. The ADCs 106 and 116 convert output signals of the LPFs 104 and 114 to digital signals, and thus respectively output I reception data and Q reception data to the digital part 200.

The digital part 200 includes despreading parts 202 and 222, I&D (Integrate & Dump) parts 204 and 224, antenna pattern removers 206 and 226, two-symbol accumulators (ACCs) 208 and 228, a frequency error detector & frequency error combiner 210, a frequency multiplier 212, a loop filter 214, and a DAC (Digital-to-Analog Converter) 216.

The despreading parts 202 and 222 multiply the same code by the spreading data using a channel code at a transmission end of a base station. The channel code is adapted to separate a specific channel from a variety of channels. The I&D parts 204 and 224 perform an I & D operation on output signals of the despreading parts 202 and 222 during a predetermined time period, respectively, and thus detect coordinates of a current reception symbol. The antenna pattern removers 206 and 226 remove antenna patterns from output signals of the I&D parts 204 and 224. The accumulators 208 and 228 accumulate the despreading data for a predetermined time period, and output accumulated data. The frequency error detector & frequency error combiner 210 determine a frequency offset value on the basis of the output signals of the accumulators 208 and 228, and output a frequency offset estimation value.

The loop filter 214 filters the frequency offset estimation value received from the frequency error detector & frequency error combiner 210, and outputs the filtered result signal. The DAC 216 converts a digital-type frequency offset estimation value received from the loop filter 214 to an analog-type signal, and outputs the analog-type signal to the VCTCXO 118 being a local oscillator.

Figure 4:
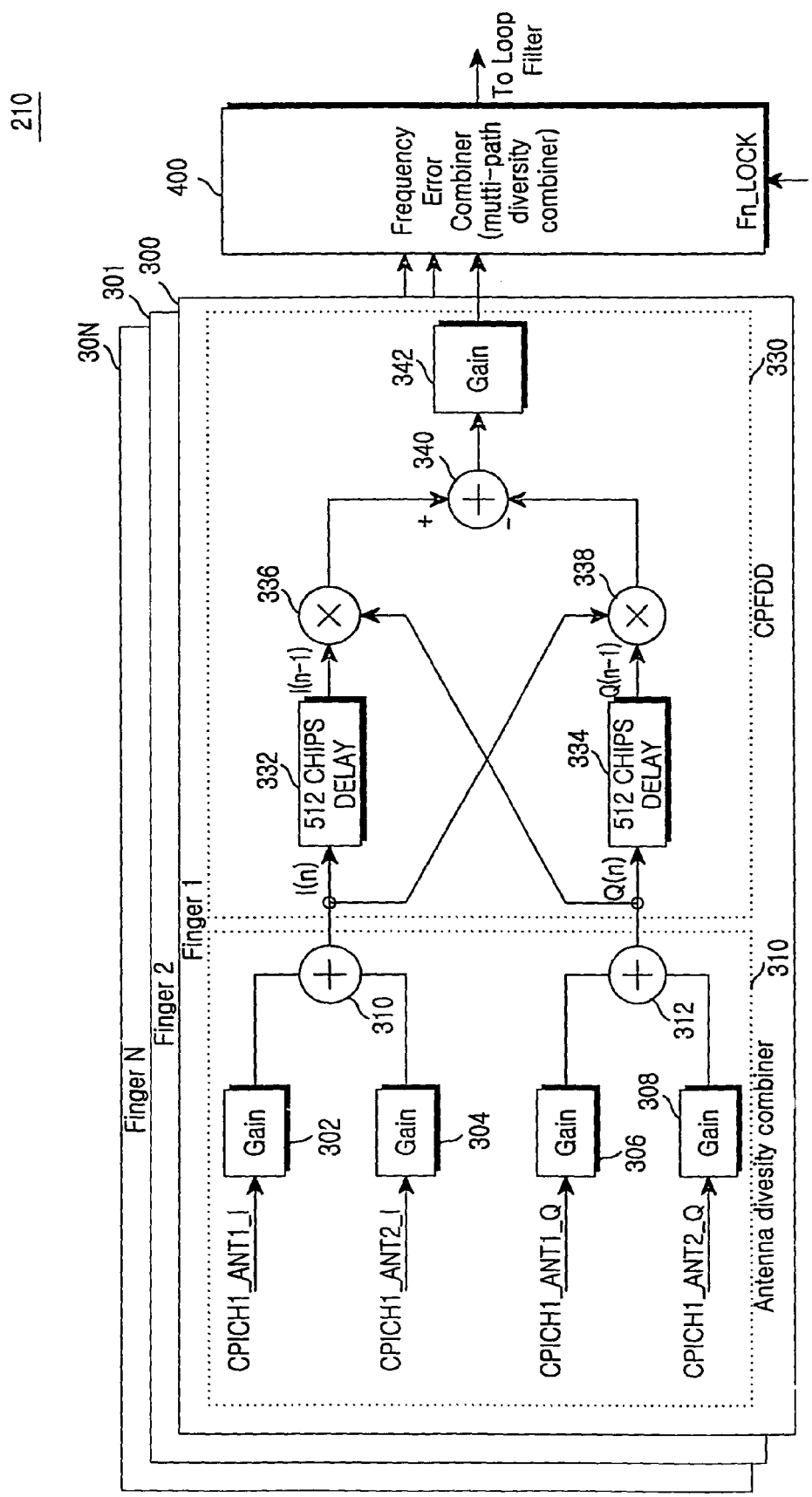
FIG. 4 is a view illustrating a block diagram of a frequency error detector and a frequency error combiner in accordance with a preferred embodiment of the present invention.

FIG. 4 is a view illustrating a block diagram of a frequency error detector and a frequency error combiner in accordance with a preferred embodiment of the present invention.

A frequency offset occurs between a carrier frequency of a reception signal and an oscillation frequency of a VCTCXO of a mobile station due to an inaccuracy of the VCTCXO 118 (shown in FIG. 3) of base and mobile stations and a Doppler frequency of a mobile channel. A reception data distortion occurring due to the frequency offset has bad influence on data demodulation. Therefore, a feedback loop for detecting the frequency offset to synchronize the oscillation frequency with a frequency of the reception signal is needed to minimize the frequency offset. An AFC loop functions as a feedback loop, and a FDD (Frequency Difference Detector) detects a frequency difference. A specific FDD for cross-multiplying values of delayed I and Q channels by original values is called a CPFDD (Cross Product Frequency Difference Detector).

The present invention divides a frequency error combiner into a frequency error combiner using an antenna and a frequency error combiner using a multipath. A frequency error combiner for obtaining a diversity effect by an antenna in case of a STTD (Space Time Transmit Diversity) is positioned in front of a frequency error detector. So, although one signal has an incorrect value due to noise, the incorrect value can be compensated for by the other signal and the amount of hardwares can be reduced because a CPFDD block is reduced in proportion to the number of fingers.

The frequency error detector & frequency error combiner shown in FIG. 4 includes an antenna diversity combiner 310, a CPFDD 330 and a frequency error combiner 400. The antenna diversity combiner 310 and the CPFDD 330 are included in each finger of each path of a multipath. The frequency error combiner 400 is connected to the fingers of each path, combines frequency errors, and outputs the combined frequency errors to the loop filter 214 shown in FIG. 3.

The antenna diversity combiner 310 combines CPICH reference symbols received from first and second antennas 1 and 2. For this operation, the antenna diversity combiner 310 includes level controllers 302 and 304 for adjusting a level of an I signal generated from the first antenna 1 and a level of an I signal generated from the second antenna 2, and level controllers 306 and 308 for adjusting a level of a Q signal generated from the first antenna 1 and a level of a Q signal generated from the antenna 2. These level controllers 302, 304, 306 and 308 properly adjust input signal levels. Also, the antenna diversity combiner 310 includes an adder for adding I signals generated from the first and second antennas 1 and 2, and an adder 310 for adding Q signals generated from the first and second antennas 1 and 2. Therefore, CPICH reference symbols are combined to each other before they are transmitted to a CPFDD 330. As a result, although one signal becomes too weak due to noise, the overall signal is not affected by the other signal, and the amount of hardware for implementing the CPFDD 330 can be reduced from 2 per finger to 1 per finger.

The CPFDD 330 includes two delays 332 and 334, two multipliers 336 and 338, an adder 340, and a level controller 342. Two delays 332 and 334 delay I channel data I(n) and Q channel data Q(n), and output I channel data I(n−1) and Q channel data Q(n−1), respectively. Meanwhile, the multiplier 336 multiplies the I channel data I(n−1) generated from the delay 332 by the Q channel data Q(n) not delayed, and the multiplier 338 multiplies Q channel data Q(n−1) by the I channel data I(n) not delayed. The adder 340 subtracts an output signal of the multiplier 338 from an output signal of the multiplier 336, and generates the resultant signal as a frequency offset value. The level controllers 342 adjusts the frequency offset value generated from the adder 340 to an appropriate level, and outputs the adjusted frequency offset value to a frequency error combiner 400. The frequency error combiner 400 combines frequency offset values generated from each finger, and outputs the combined frequency offset values to a loop filter 214. The frequency error combiner 400 for obtaining diversity effect by a multipath selectively combines the above output signals of the CPFDD 330 with reference to a Fn_LOCK signal of a lock detector (not shown).

Figure 5:
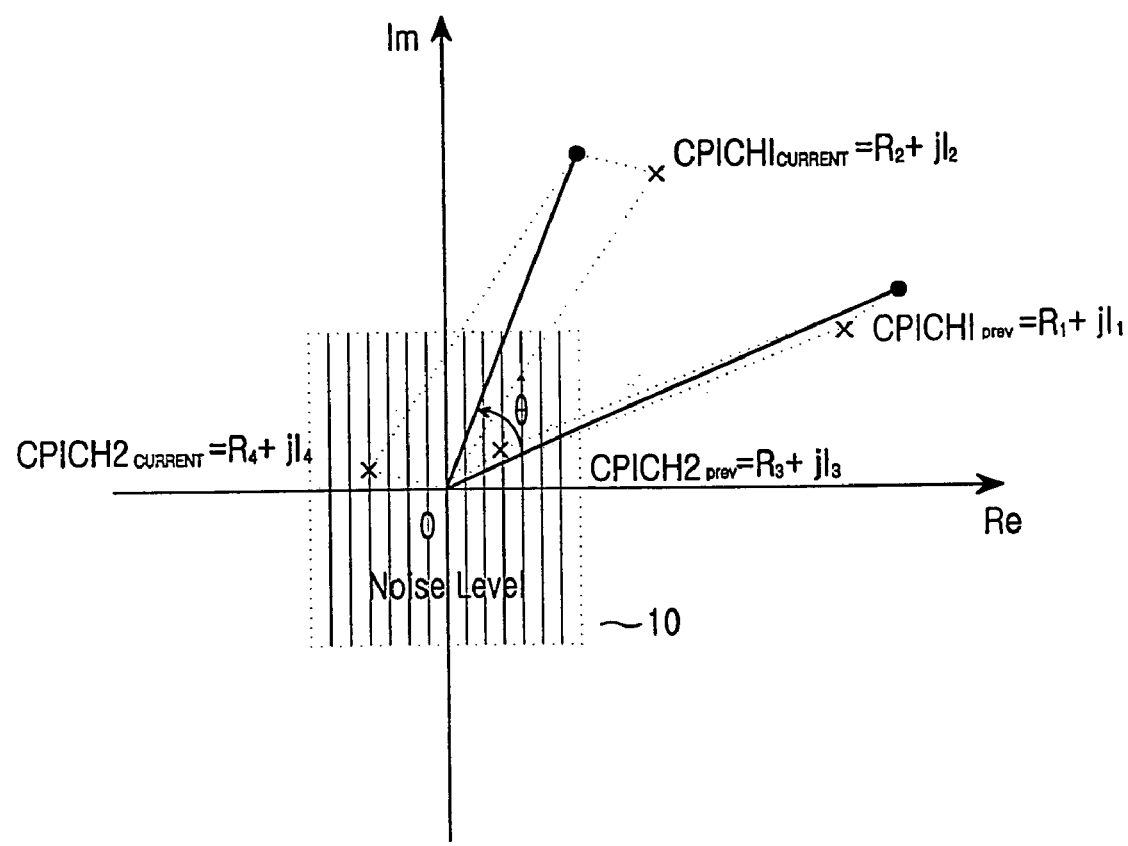
FIG. 5 is a complex plane illustrating an operation for generating input signals of a cross product frequency difference detector (CPFDD) by pre-combining CPICH reference symbols of first and second antennas 1 and 2 in accordance with a preferred embodiment of the present invention.

FIG. 5 is a complex plane illustrating an operation for generating input signals of a CPFDD by pre-combining CPICH reference symbols of first and second antennas 1 and 2 in accordance with a preferred embodiment of the present invention. Referring to FIG. 5, the present invention combines a CPICH1 signal generated from a first antenna 1 with a CPICH2 signal generated from a second antenna 2, and then outputs the resultant signal to a frequency error combiner. Therefore, in accordance with the present invention, although one signal has a wrong value due to noise, the wrong value can be compensated by the other signal.

As apparent from the above description, in accordance with the present invention, a frequency error combiner for obtaining a diversity effect by an antenna in the case of a STTD (Space Time Transmit Diversity) is positioned in front of a frequency error detector. So, although one signal has an incorrect value due to noises, the incorrect value can be compensated for by the other signal and the amount of hardware can be reduced because a CPFDD block is reduced in proportion to the number of fingers. Namely, the present invention prevents AFC loop performance deterioration caused by an incorrect frequency error detection in case of a serious fading phenomenon, and actually reduces the amount of CPFDD hardware by half in each finger.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A frequency error detector and combiner using a diversity operation at a reception end of a mobile communication system, comprising:
   a plurality of fingers each having a diversity combiner for diversity-combining reference symbols used for frequency error detection, and a frequency error detector for combining output signals of the diversity combiner to generate a frequency offset value; and
   a frequency error combiner for performing a multipath diversity combination on output signals of each frequency error detector;
   wherein each frequency error detector is connected between its corresponding diversity combiner and the frequency error combiner.

2. The frequency error detector and combiner as set forth in claim 1, wherein the diversity combiner uses a complex number combination.

* * * * *

UNITED STATES PATENT AND TRADEMARK OFFICE
CERTIFICATE OF CORRECTION

| | | |
|---|---|---|
| PATENT NO. | : 7,584,410 B2 | Page 1 of 1 |
| APPLICATION NO. | : 10/634451 | |
| DATED | : September 1, 2009 | |
| INVENTOR(S) | : Won-Ick Ahn | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1528 days.

Signed and Sealed this

Fourteenth Day of September, 2010

David J. Kappos
*Director of the United States Patent and Trademark Office*